United States Patent
Banda et al.

(10) Patent No.: US 8,561,166 B2
(45) Date of Patent: Oct. 15, 2013

(54) EFFICIENT IMPLEMENTATION OF SECURITY APPLICATIONS IN A NETWORKED ENVIRONMENT

(75) Inventors: Seenu Banda, Rutherford, CA (US); Ankur Prakash, Santa Clara, CA (US)

(73) Assignee: Alcatel Lucent, Paris (FR)

( * ) Notice: Subject to any disclaimer, the term of this patent is extended or adjusted under 35 U.S.C. 154(b) by 939 days.

(21) Appl. No.: 11/620,726

(22) Filed: Jan. 7, 2007

(65) Prior Publication Data

US 2008/0168549 A1 Jul. 10, 2008

(51) Int. Cl.
*H04L 29/06* (2006.01)

(52) U.S. Cl.
USPC ............... 726/13; 713/153; 713/154; 726/11; 726/12; 726/14; 726/15

(58) Field of Classification Search
USPC ...................................... 726/13, 11
See application file for complete search history.

(56) References Cited

U.S. PATENT DOCUMENTS

| | | | | |
|---|---|---|---|---|
| 6,085,238 A * | 7/2000 | Yuasa et al. | ................ | 709/223 |
| 6,550,012 B1 * | 4/2003 | Villa et al. | ................ | 726/11 |
| 7,346,924 B2 * | 3/2008 | Miyawaki et al. | ................ | 726/6 |
| 7,562,389 B1 * | 7/2009 | Goyal et al. | ................ | 726/22 |
| 7,680,876 B1 * | 3/2010 | Cioli et al. | ................ | 709/201 |
| 7,954,143 B2 * | 5/2011 | Aaron | ................ | 726/11 |
| 8,122,495 B2 * | 2/2012 | Ramsey et al. | ................ | 726/13 |
| 2002/0112185 A1 * | 8/2002 | Hodges | ................ | 713/201 |
| 2003/0097589 A1 * | 5/2003 | Syvanne | ................ | 713/201 |
| 2003/0172292 A1 * | 9/2003 | Judge | ................ | 713/200 |
| 2004/0003286 A1 * | 1/2004 | Kaler et al. | ................ | 713/201 |
| 2004/0078621 A1 * | 4/2004 | Talaugon et al. | ................ | 714/4 |
| 2004/0264697 A1 * | 12/2004 | Gavrilescu et al. | ................ | 380/255 |
| 2005/0259571 A1 * | 11/2005 | Battou | ................ | 370/217 |
| 2005/0262362 A1 * | 11/2005 | Patrick et al. | ................ | 713/193 |
| 2006/0112426 A1 * | 5/2006 | Smith et al. | ................ | 726/13 |
| 2006/0195896 A1 * | 8/2006 | Fulp et al. | ................ | 726/11 |
| 2006/0212572 A1 * | 9/2006 | Afek et al. | ................ | 709/225 |
| 2007/0016663 A1 * | 1/2007 | Weis | ................ | 709/223 |
| 2007/0214352 A1 * | 9/2007 | Convery et al. | ................ | 713/153 |
| 2008/0022401 A1 * | 1/2008 | Cameron et al. | ................ | 726/22 |
| 2008/0071915 A1 * | 3/2008 | Gbadegesin | ................ | 709/228 |
| 2008/0168549 A1 * | 7/2008 | Banda et al. | | |
| 2008/0235755 A1 * | 9/2008 | Blaisdell et al. | ................ | 726/1 |

* cited by examiner

*Primary Examiner* — Jeffrey Pwu
*Assistant Examiner* — Thomas C Lauzon
(74) *Attorney, Agent, or Firm* — Law Firm of Naren Thappeta

(57) ABSTRACT

Community based defense, in which multiple security devices operate as a part of a single community in providing security defense i.e. avoiding redundant security checks and enables efficient deployment and utilization of resources. The devices in a community communicate with each other to determine their roles and the security policies to enforce, based on the specific role they have undertaken. Thus primary player may operate with a larger set of security policies. However, the secondary players (operating on smaller policy sets) may periodically check the operational status of the primary player and assumes the role of primary, if needed. Later, it may gracefully relinquish the temporary role back to former primary, once the primary is up and operational.

20 Claims, 6 Drawing Sheets

EFFICIENT IMPLEMENTATION OF SECURITY APPLICATIONS IN A NETWORKED ENVIRONMENT

BACKGROUND OF THE INVENTION

1. Field of the Invention

The present disclosure relates generally to network security, and more specifically to a method and apparatus for implementing security applications efficiently in a network environment containing several gateway systems.

2. Related Art

A networked environment generally contains several systems (from which users access various resources or at which resources are available for access) connected by a network. A network in turn contains various switches connecting the systems by appropriate communication paths, as is well known in the relevant arts.

Security applications are often implemented in networked environments, generally to protect systems from undesirable packets. In general, a security application examines the content (typically header as well as payload) of various packets and determines whether to forward or block the packets. The packets are often scanned for determining various threats such as DOS attacks and viruses, and packets may be blocked depending on the level of security threat detected.

Security applications are often implemented on several security devices (often termed as security gateways) provided along with the network. The security devices may include gateways which provide other utilities such as switching (in which case the switch is often referred to as a gateway), and special purpose devices dedicated for security related applications alone.

It is generally desirable that the security application(s) be implemented efficiently so that resource requirements such as processing power and/or memory are reduced.

BRIEF DESCRIPTION OF THE DRAWINGS

The present invention will be described with reference to the accompanying drawings, which are described below briefly. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion

In one embodiment, security devices communicate to determine the respective roles within a community designed for a security application, and then operate according to the determined role. For example, a first device in the community may be determined as a primary player and other devices may be determined as secondary players. The primary player may then operate with more stringent security policies (e.g., larger set of signatures in case of a anti-virus application) and the secondary players may operate with less stringent security policies.

Assuming the primary player would cover any deficiencies in the security operation of the secondary player and both the players are in the path to the (user/server) systems sought to be protected, a desired high security level may be attained by a combination of operation of the two players. At the same time, the computational requirements in the secondary players are reduced.

According to another aspect of the present invention, a secondary player checks the operational status of the (original) primary player, and may revert to operation as a primary player if the original primary player is determined not to be operational. The operational devices may communicate again to determine the respective roles to determine if such a role change is required.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
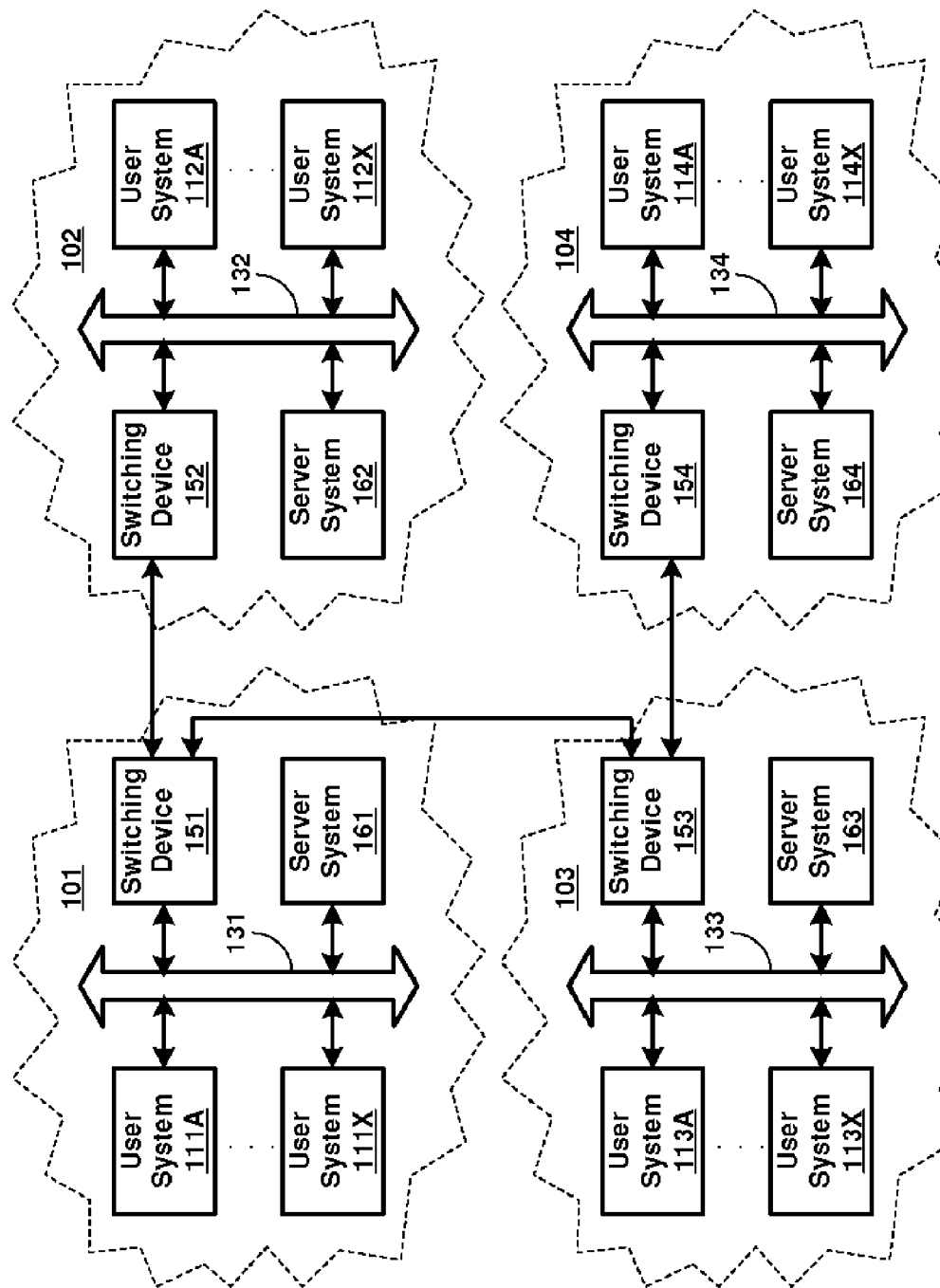
FIG. 1 is a block diagram illustrating an example environment in which several aspects of the present invention can be implemented.

FIG. 1 is a block diagram illustrating the details of an example environment in which various aspects of the present invention can be implemented. The environment is shown containing locations 101-104, with location 101 shown containing user systems 111A-111X, local-area-network (LAN) 131, switching device 151, server system 161, location 102 containing user systems 112A-112X, local-area-network (LAN) 132, switching device 152, server system 162, location 103 containing user systems 113A-113X, local-area-network (LAN) 133, switching device 153, server system 163, and location 104 containing user systems 114A-114X, local-area-network (LAN) 134, switching device 154, and server system 164.

For illustration, it is assumed that location 101 corresponds to a corporate office having various communication facilities as a hub and locations 102-104 correspond to branch offices. It may be observed that locations 102 and 103 are connected directly to location 101 and location 104 is connected via location 103. Each block of FIG. 1 is described in further detail below. Merely for illustration, the components of location 101 are described in detail, even though the description would be applicable to the components of other locations as well.

User systems 111A-111X represent devices, which can be used to access various data and services (e.g., on server system 161) using LAN 131. LAN 131 may also be implemented using IP (and Ethernet), and provide communication between user systems 111A-111X, as well as with external systems (e.g., server system 164). Server system 161 represents a system from which data and services can be accessed from user systems 111A-111X.

Switching device 151 forwards packets from one interface to other (operating as a router), and also implements various services (e.g., firewall, intrusion detection system). In embodiment(s) described below, switching device 151 is assumed to operate consistent with Internet Protocol (IP) and thus the interface on which the packet is forwarded, depends on the destination IP address of the packet.

Switching device 151 is shown connected to switching devices 152 and 153 by corresponding communication links. Switching device 153 is in turn shown connected to switching device 154. Each of the switching devices 151-154 may also operate as a security device (and thus interchangeably referred to as a switching device of security device), which selectively forwards some of the packets by implementing the corresponding security applications. The manner in which the security applications may be implemented efficiently in various switches is described below in further detail.

3. Implementing Security Applications Efficiently

Figure 2A:
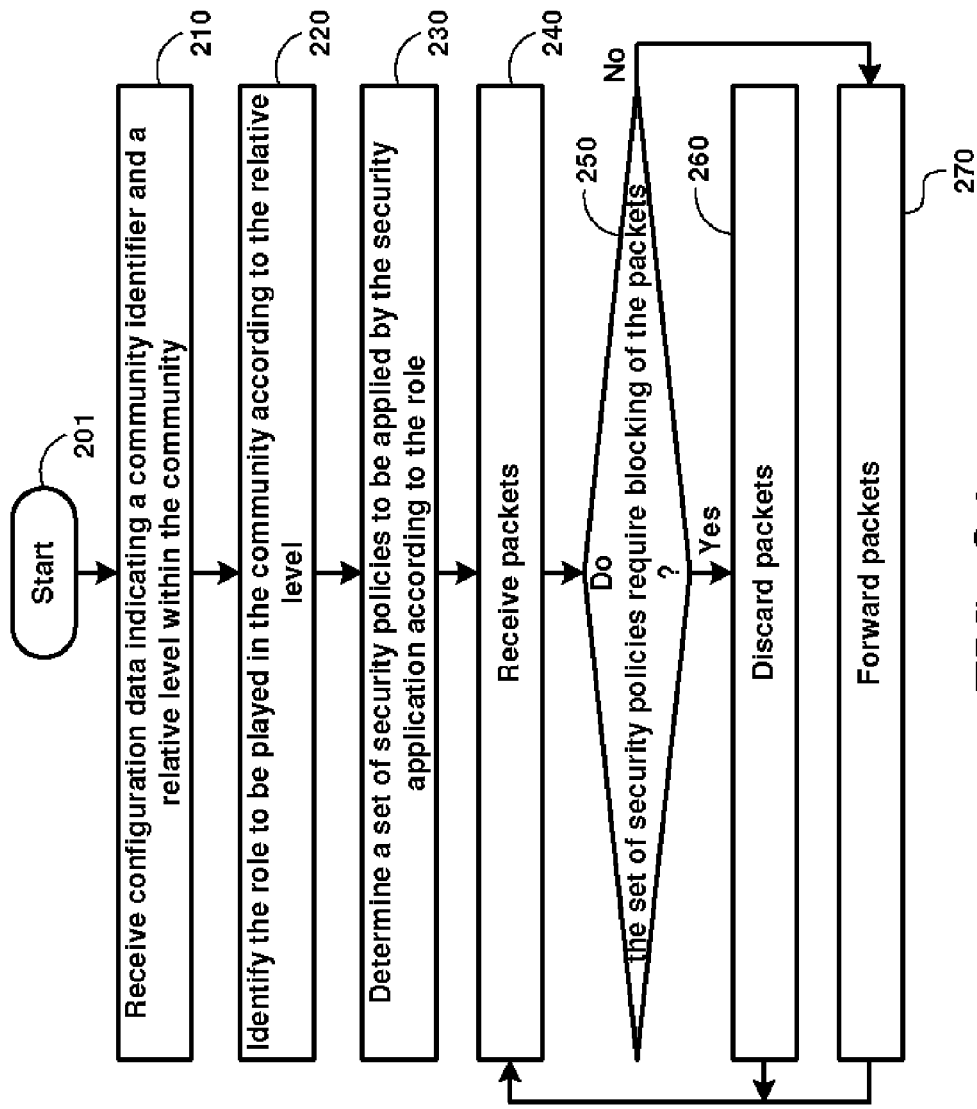
FIG. 2A is a flow chart illustrating the manner in which security applications are implemented efficiently in an embodiment of the present invention.

FIG. 2A is a flowchart illustrating the manner in which security applications are implemented in security devices in an embodiment of the present invention. The flowchart is described with reference to FIG. 1 merely for illustration. However, the various features can be implemented in other devices/environments as well, as will be apparent to one skilled in the relevant arts by reading the disclosure provided herein. The flowchart starts in step 201, in which control passes to step 210.

In step 210, switching device 151 receives configuration data indicating a community identifier and a relative level within the community. The configuration data may be received from a non-volatile memory provided within switching device 151 or from an external device on a network.

The community identifier uniquely identifies the community to which the device belongs, and the relative level is used to determine the role to be played by the device when implementing a security application. A community represents a group of devices which operate cooperatively in implementing a security application. An administrator may configure the community identifier and relative level to control the members of a community and a role to be played by the security device.

In step 220, switching device 151 identifies the role to be played in that community based on the relative level. The device may communicate with other devices in identifying the role. In an embodiment described below, only one of the members of a community operates as a primary device and the others operate as secondary devices. The device configured with the highest relative level may assume the role of the primary device, while the remaining devices assume the role of secondary devices.

In step 230, switching device 151 determines a set of security policies to be applied by the security application according to the identified role. In one embodiment, each security application operates using a set of security policies, which determine the specific packets to be discarded or forwarded. Multiple sets of security policies may be stored, with each set corresponding to one of the corresponding roles. For illustration, an exhaustive set of security policies (IDS signatures) may be used associated with a primary role, and a less stringent set of roles may be associated with a secondary role.

In step 240, switching device 151 receives packets for forwarding. In step 250, switching device checks whether the identified set of security policies permits the packets to be forwarded or blocked according to the security application. The header and/or payload of potentially multiple packets may be examined according to the security policies in determining whether to forward or block packets.

From step 250 control passes to step 260 if the packets are to be discarded and to step 270 otherwise. In step 260, switching device 151 discards (or blocks) the packets. Control then passes to step 240 to process more packets.

In step 270, switching device 151 forwards the data packets to the recipient specified by the destination (IP) address of the packet. Accordingly, the forwarding may be caused by operation of switching device 151 as an IP routing device. Control then passes to step 240.

It should be appreciated that the flowchart of FIG. 2A may be implemented in each of the devices operating in any of the communities. The devices exchange information based on the configuration data received in step 210, to determine the respective roles. The security policies may then be chosen corresponding to the determined role.

Thus, the packets are processed according to the security policies determined by the role. While the flowchart is described assuming that a security device operates with the same role, it should be appreciated that the role can change, as described below with an example.

4. Switching Device Changing Roles

Figure 2B:
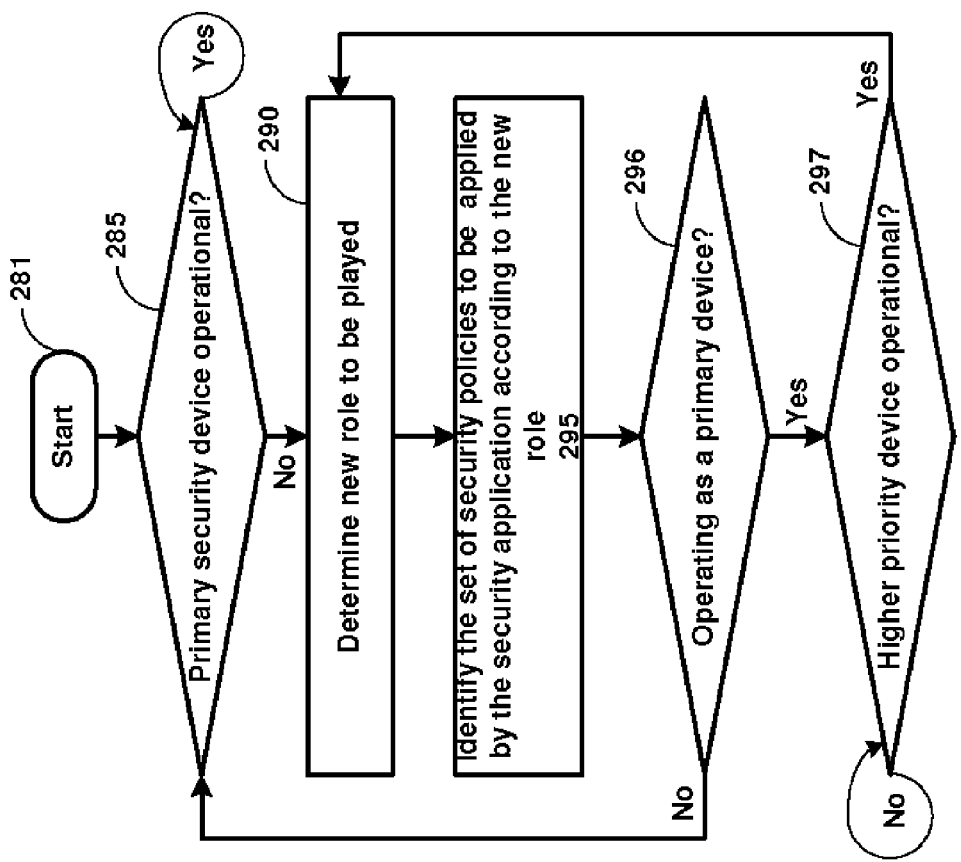
FIG. 2B is a flow chart illustrating the manner in which security devices change roles in an embodiment of the present invention.

FIG. 2B is a flow chart illustrating the manner in which a security device changes role in an embodiment of the present invention. The flowchart is described with reference to FIG. 1 (assuming security device 152 is operating as a secondary security device and security device 151 is operating as a primary security device) merely for illustration. However, the various features can be implemented in other devices/environments as well. The flowchart starts in step 281, in which control passes to step 285.

In step 285, security device 152 checks whether primary security device 151 is operational. The checking may be implemented through well known heart-beat/Keep-Alive 'message' type mechanisms. Missing responses to more than 3 consecutive keep-alive messages may lead to the conclusion that primary security device 151 is not operational. The number of Keep-Alive messages to determine the state change is administratively configurable. Control passes to step 285 if primary security device 151 is operational and to step 290 otherwise. The loop around 285 indicates that the status is checked periodically.

In step 290, security device 152 determines the new role to be played in view of the non-operational status of security application on primary security device 151. In step 295, security device 152 identifies the set of security policies to be applied by the security application based on the new role.

In step 296, security device 152 checks whether it is operating as a primary security device temporarily (due to the non-operational status of switching device 151). Control transfers to step 285 if security device 152 is operating as a secondary security device. Otherwise, control passes to step 297.

In step 297, security device 152 monitors the status of other security devices to determine whether any device configured with higher priority has become operational. Control remains in step 297 until such a condition is detected. Control transfers to step 290 when primary security device 151 is determined to be operational.

Thus, a device configured with lower priority may operate as a primary security device only so long as higher priority devices are non-operational. It should be further appreciated that each security device can be configured to be a part of multiple communities as described below in further detail.

5. Communities

Figure 3:
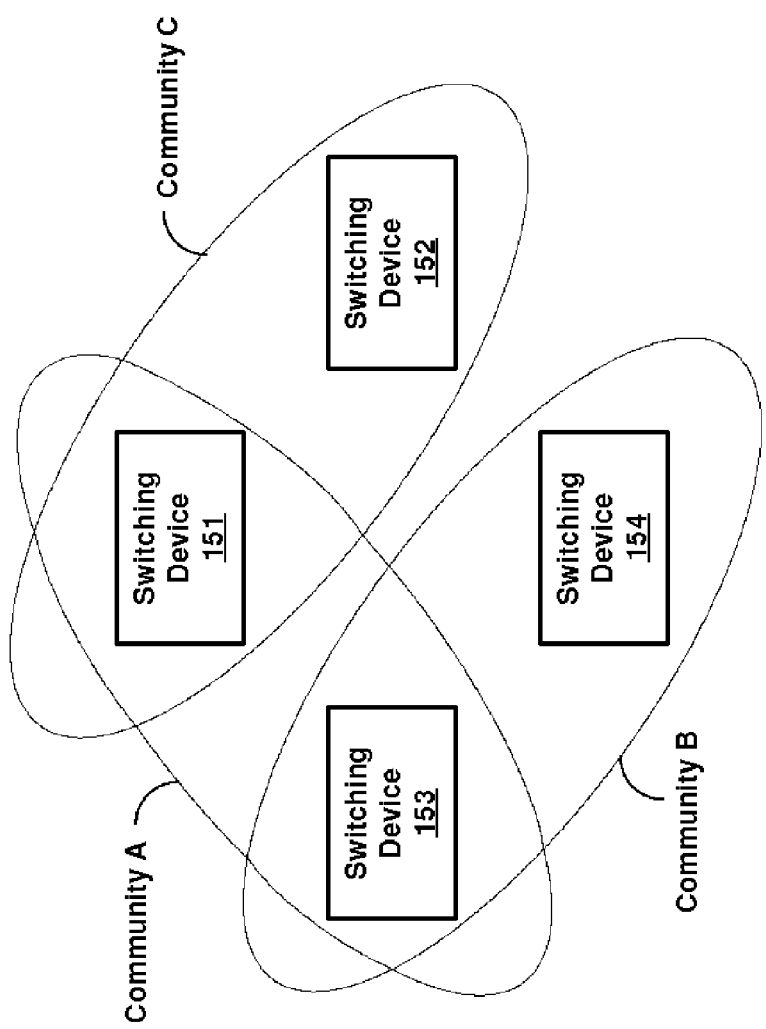
FIG. 3 is a block diagram illustrating the manner in which different security devices can be part of different communities in an embodiment.

FIG. 3 is a block diagram illustrating the manner in which different security devices can be part of different communities in an embodiment. The diagram is shown assuming the following configurations security device 151
    configuration community=comm-A level=25
    configuration community=comm-C level=25
    security device 152
    configuration community=comm-C level=50
    security device 153
    configuration community=comm-A level=50
    configuration community=comm-B level=25
    security device 154
    configuration community=comm-B level=50

Thus, it may be appreciated that security devices 151 and 153 are configured to be members of multiple communities. Though the configuration data above is shown without reference to specific security application, it should be appreciated that the approach of above can be used to specify potentially different communities and levels for different security applications.

It is further assumed that each device can take on only one of two possible roles (primary and secondary), with the lower value indicating a more stringent (primary) role. Thus, security device 151 would operate with a primary role in both communities A and C. However, if it is desirable to limit the processing (related to security application) in the root nodes (i.e., 151), the lower level devices (152 and 153) may be configured with lower level values to cause them to operate with primary roles.

As noted above with respect to FIG. 2B, when a primary device (151 in case of communities A and C, and 153 in case of communities A and B) becomes non-operational, the devices in the corresponding communities may communicate again to determine the new roles.

Thus, it may be appreciated that communication can be used to determine the roles of the devices in each community. Various approaches (distributed, centralized, etc.) can be used in determining the roles. In an embodiment, the BGP (Border Gateway Protocol) protocol is extended to provide for the communication (in a distributed manner). In general, the communication needs to contain data to indicate the necessary information and can be included by extending any protocol (for example as specified in Assigned Numbers RFC 1700), as will be apparent to one skilled in the relevant arts.

It should be appreciated that the features described above may be implemented in various combinations of hardware, software and firmware, depending on the corresponding requirements. The description is continued with respect to some example embodiments.

6. Switching Device

Figure 4:
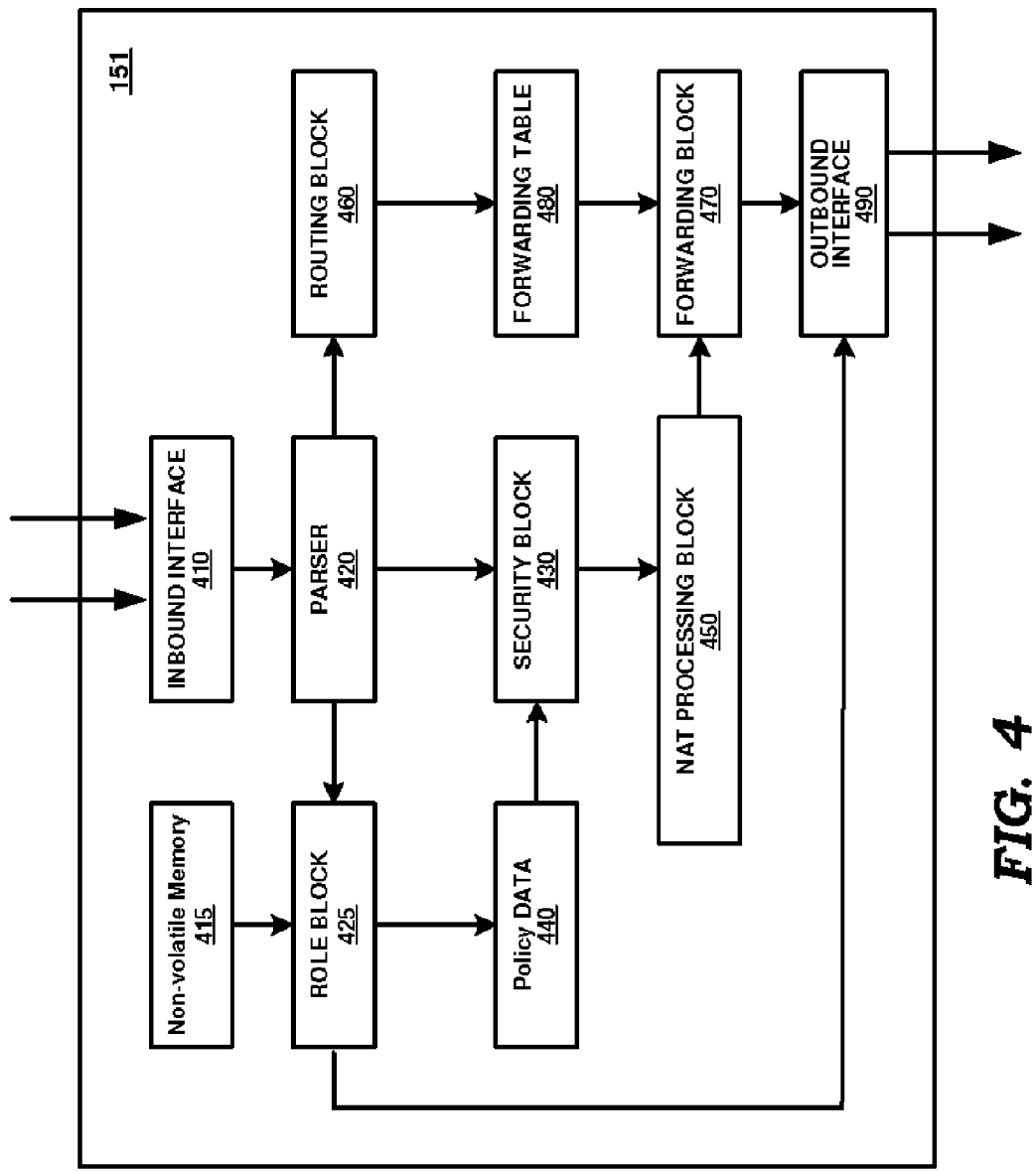
FIG. 4 is a block diagram illustrating the details of a gateway device supporting security applications in an embodiment of the present invention.

FIG. 4 is a block diagram illustrating the details of a switching device supporting security applications in an embodiment of the present invention. Switching device 151 is shown containing inbound interface 410, parser 420, non-volatile memory 415, role block 425, security block 430, policy data 440, NAT processing block 450, routing block 460, forwarding block 470, forwarding table 480 and outbound interface 490. Each block is described below in further detail.

Inbound interface 410 and outbound interface 490 provide electrical and protocol interfaces to respectively receive and send internet protocol (IP) packets on an appropriate medium. Inbound interface 410 (packets received from one of LAN or communication path shown by a bidirectional line to external switching device) forwards the received packets to parser 420. Outbound interface 490 forwards packets received from forwarding block 470 to LAN 131 or the communication path as specified by forwarding block 470. Inbound interface 410 and outbound interface 490 may be implemented in a known way.

Parser 420 examines each IP packet received from inbound interface 410 to determine whether to forward packets to role block 425, security block 430 or routing block 460. In general, packets related to determination of roles (e.g., according to steps 220, 285 and 290) are forwarded to role block 425, packets related to routing updates (e.g., according to protocols such as RIP, OSPF, well known in the relevant arts) are forwarded to routing block 460, and packets which need to be switched/routed are forwarded to security block 430.

Routing block 460 receives packets representing routing updates (links up/down, congestion metrics, etc.) and translates the updates into (and stores as) entries in forwarding table 480. Each entry of forwarding table 480 may indicate the specific path/physical port (which specifies the communication path) on which packets with matching destination IP addresses are to be forwarded (permitting packet switching at layer-3/IP level).

Nonvolatile memory 415 stores the different sets of security policies which can be used by security block 430 in implementing a security application. Configuration data indicating the community identifiers and the relative levels within the community may also be stored in non-volatile memory 415.

Role block 425 identifies the corresponding role played by the switching device 151 for each of the security applications implemented by security block 430. Role block 425 may send any necessary packets to other security devices using outbound interface 490 and receive packets from other security devices via parser 420 in identifying the roles.

Role block 425 retrieves the policy set corresponding to the identified role and stores the policy set in policy data 440. Policy data 440 may be implemented in a random access memory (RAM), and a suitable mechanism (well known in the relevant arts) may be provided to cause security block 430 to switch to a new policy set if role block 425 determines to change the role according to FIG. 2B (and the corresponding policy set is stored in policy data 440).

Security block 430 executes each security application of relevance, for example, based on the packets and policy rules applicable to the device. With respect to applications operating according to rules, security block 430 may execute the security applications according to the policies in policy data 440 to determine whether to discard the packets received. The packets determined not to be discarded, are forwarded to NAT processing block 450.

NAT processing block 450 performs any required network address translation operation on various addresses (port numbers or IP addresses, typically) in the packet headers (according to TCP/UDP/IP). The packets with such translated addresses are provided to forwarding block 470.

Forwarding block 470 may forward the packets (using outbound interface 490) based on the entries in forwarding table 480, usually based on the destination address present in the header. In general, the specific interface (path/physical port) on which to forward the packet is determined based on the destination address.

Thus, due to the operation of role block 425, different set of security policies may be applied by security applications depending on the assumed role. As the resource requirements (processing power, memory requirements, etc.) differ based on the set of security policies used, a network administrator may conveniently configure different security devices to operate with different resource requirements in implementing security applications.

While the operation of role block 425 is described with respect to changing sets of security policies to control the role played by the specific switching device, it should be appreciated that other approaches can be employed to change the roles, as suitable for the specific security application. For example, anomaly based detection systems can employ different set of heuristics depending on the specific role being played.

The description is continued with respect to an embodiment in which some of such features are operative upon execution of the corresponding software instructions.

7. Software Implementation

Figure 5:
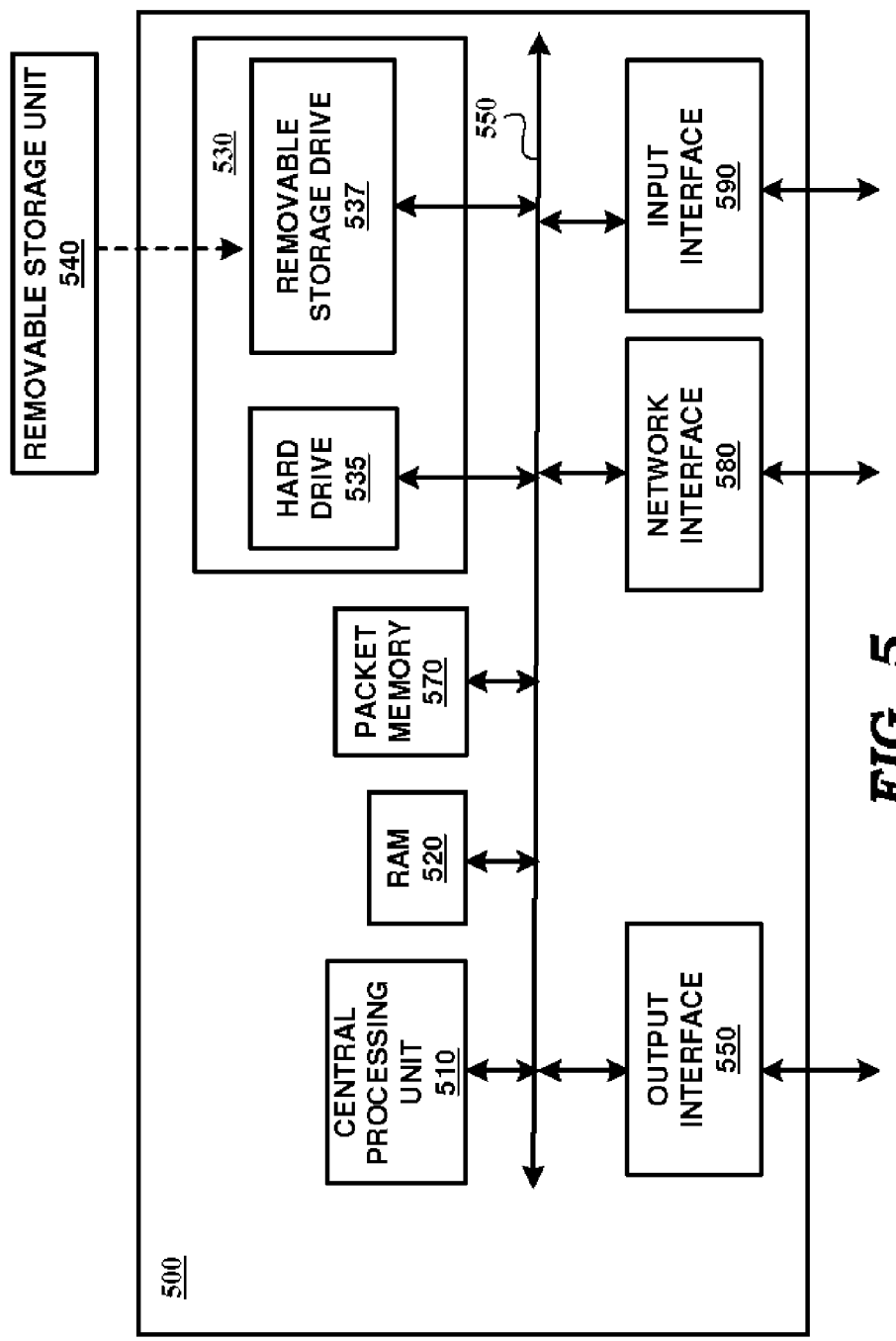
FIG. 5 is a block diagram illustrating the details of an embodiment of a digital processing system in which various aspects of the present invention are operative by execution of appropriate software instructions.

FIG. 5 is a block diagram illustrating the details of digital processing system 500 in one embodiment. System 500 may correspond to switching device 151. System 500 is shown containing central processing unit 510, random access memory (RAM) 520, secondary memory (storage) 530, output interface 550, packet memory 570, network interface 580 and input interface 590. Each component is described in further detail below.

Input interface 590 (e.g., interface with a key-board and/or mouse, not shown) enables a user/administrator to provide any necessary inputs to system 500. Output interface 550 provides output signals (e.g., display signals to a display unit, not shown), and the two interfaces together can form the basis for a suitable user interface for an administrator to interact with system 500. The administrator may provide various configuration data noted above using such an interface.

Network interface 580 may enable system 500 to send/receive data packets to/from other systems on corresponding paths using protocols such as internet protocol (IP). Network interface 580, output interface 550 and input interface 590 can be implemented in a known way.

RAM 520, secondary memory 530, and packet memory 570 may together be referred to as a memory. RAM 520 receives instructions and data on path 550 (which may represent several buses) from secondary memory 530, and provides the instructions to central processing unit 510 for execution. RAM 520 may be used to store the various tables (e.g., routing table and policies data) described above.

In general the various memories noted above (whether read only or random access, removable or not, etc.) represent example computer/machine readable medium from which instructions can be retrieved and executed by various processors.

Packet memory 570 stores (queues) packets waiting to be forwarded (or otherwise processed) on different ports/interfaces. Secondary memory 530 may contain units such as hard drive 535 and removable storage drive 537.

Some or all of the data and instructions may be provided on removable storage unit 540 (or from a network using protocols such as Internet Protocol), and the data and instructions may be read and provided by removable storage drive 537 to central processing unit 510. Floppy drive, magnetic tape drive, CD-ROM drive, DVD Drive, Flash memory, removable memory chip (PCMCIA Card, EPROM) are examples of such removable storage drive 537.

Central processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520. In general, central processing unit 510 reads sequences of instructions from various types of memory medium (including RAM 520, storage 530 and removable storage unit 540), and executes the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of supporting security applications in a switching device connected to a network, said switching device providing connectivity to a plurality of user systems connected to said network, said switching device having a first interface and a second interface, said second interface being coupled in a direction of said network and said first interface being coupled in a direction of external systems with which said plurality of user systems communicate via said switching device, said switching device being designed to protect said user systems from systems external to said network by blocking undesirable packets from said external systems, said method being performed in said switching device, said method comprising:

confirming a community to which said switching device belongs and a role to be played by said switching device in said community, said community representing a first set of switching devices including at least said switching device and an another switching device cooperatively implementing a first application by playing either a first role or a second role in said community, wherein said switching device is designed to play one of said first role or second role, while said another switching device plays the other one of said first role and said second role, wherein said switching device and said another switching device are in a sequential path for processing packets such that the packets forwarded by the first switching device in the sequential path are processed by the other switching device, wherein said confirmation of said role to be played by each of said switching device and said another switching device is based on communication between the two devices, wherein said first role and said second role are played by the respective ones of the two switching devices, responsive to said communication;

receiving a plurality of packets on said first interface;

blocking a first subset of packets according to said first application if said role to be played is said first role and a second subset of packets according to said first application if said role to be played is said second role, wherein each of said first subset of packets and said second subset of packets is contained in said plurality of packets, wherein said first subset of packets is not equal to said second subset of packets and wherein said first role is not identical to said second role; and forwarding those of said plurality of packets which are not blocked by said blocking on said second interface, whereby said switching device is designed to forward different sets of packets for the same application depending on the role to be played by said switching device while switching packets from said first interface to said second interface.

2. The method of claim 1, further comprising applying a first set of policies according to said first application to determine to block said first subset of packets if said role is said first role, and applying a second set of policies according to said first application to determine to block said second subset of packets if said role is said second role, wherein said blocking is performed according to the determination performed by said applying of said first set of policies or said second set of policies.

3. The method of claim 2, wherein said first set of policies comprise a first set of signatures and said second set of policies comprise a second set of signatures.

4. The method of claim 3, wherein said first application comprises an anti-virus application such that said switching device applies different sets of signatures for said anti-virus application depending on the role to be played, and thereby blocks different sets of packets depending on the role to be played.

5. The method of claim 1, wherein said confirming comprises:

retrieving a configuration data containing a community identifier and a role level;

identifying said community based on said community identifier; and communicating with other switching devices connected to said network to determine said first set of switching devices in said community and said role to be played by said switching device based on said role level, whereby said role level determines whether to block said first set of packets or said second set of packets.

6. The method of claim 1, wherein said role comprises a secondary role and another switching device takes on a primary role in said community, wherein switching devices with said secondary role operate with less stringent policies according to said first application, said method further comprising:

checking whether said first application is operational in said another switching device; and assuming said primary role if said first application is not operational in said another switching device, whereby said switching device applies more stringent policies to block more packets of said plurality of packets compared to when operating with said secondary role.

7. A computer readable medium carrying one or more sequences of instructions for enabling a switching device to support security applications, said switching device being connected to a network, said switching device providing connectivity to a plurality of user systems connected to said network, said switching device having a first interface and a second interface, said second interface being coupled in a direction of said network and said first interface being coupled in a direction of external systems with which said plurality of user systems communicate via said switching device, said switching device being designed to protect said user systems from systems external to said network by blocking undesirable packets from said external systems, wherein execution of said one or more sequences of instructions by one or more processors contained in said switching device causes said switching device to perform the actions of:

confirming a community to which said switching device belongs and a role to be played by said switching device in said community, said community representing a first set of switching devices including at least said switching device and an another switching device cooperatively implementing a first application by playing either a first role or a second role in said community, wherein said switching device is designed to play one of said first role or second role, while said another switching device plays the other one of said first role and said second role, wherein said switching device and said another switching device are in a sequential path for processing packets such that the packets forwarded by the first switching device in the sequential path are processed by the other switching device, wherein said confirmation of said role to be played by each of said switching device and said another switching device is based on communication between the two devices, wherein said first role and said second role are played by the respective ones of the two switching devices, responsive to said communication;

receiving a plurality of packets on said first interface;

blocking a first subset of packets according to said first application if said role to be played is said first role and a second subset of packets according to said first application if said role to be played is said second role, wherein each of said first subset of packets and said second subset of packets is contained in said plurality of packets, wherein said first subset of packets is not equal to said second subset of packets and wherein said first role is not identical to said second role; and forwarding those of said plurality of packets which are not blocked by said blocking on said second interface, whereby said switching device is designed to forward different sets of packets for the same application depending on the role to be played by said switching device while switching packets from said first interface to said second interface.

8. The computer readable medium of claim 7, further comprising:

applying a first set of policies according to said first application to determine to block said first subset of packets if said role is said first role, and applying a second set of policies according to said first application to determine to block said second subset of packets if said role is said second role, wherein said blocking is performed according to the determination performed by said applying of said first set of policies or said second set of policies.

9. The computer readable medium of claim 8, wherein said first set of policies comprise a first set of signatures and said second set of policies comprise a second set of signatures.

10. An apparatus in a switching device for supporting security applications, said switching device being connected to a network, said switching device providing connectivity to a plurality of user systems connected to said network, said switching device having a first interface and a second interface, said second interface being coupled in a direction of said network and said first interface being coupled in a direction of external systems with which said plurality of user systems communicate via said switching device, said switching device being designed to protect said user systems from systems external to said network by blocking undesirable packets from said external systems, said apparatus comprising:

means for confirming a community to which said switching device belongs and a role to be played by said switching device in said community, said community representing a first set of switching devices including at least said switching device and an another switching device cooperatively implementing a first application by playing either a first role or a second role in said community, wherein said switching device is designed to play one of said first role or second role, while said another switching device plays the other one of said first role and said second role, wherein said switching device and said another switching device are in a sequential path for processing packets such that the packets forwarded by the first switching device in the sequential path are processed by the other switching device, wherein said confirmation of said role to be played by each of said switching device and said another switching device is based on communication between the two devices, wherein said first role and said second role are played by the respective ones of the two switching devices, responsive to said communication;

means for receiving a plurality of packets on said first interface means for blocking a first subset of packets according to said first application if said role to be played is said first role and a second subset of packets according to said first application if said role to be played is said second role, wherein each of said first subset of packets and said second subset of packets is contained in said plurality of packets, wherein said first subset of packets is not equal to said second subset of packets and wherein said first role is not identical to said second role; and means for forwarding those of said plurality of packets which are not blocked by said blocking on said second interface, whereby said switching device is designed to forward different sets of packets for the same application depending on the role to be played by said switching device while switching packets from said first interface to said second interface.

11. The apparatus of claim 10, further comprising means for applying a first set of policies according to said first application to determine to block said first subset of packets if said role is said first role, and means for applying a second set of policies according to said first application to determine to block said second subset of packets if said role is said second role.

12. The apparatus of claim 11, wherein said first set of policies comprise a first set of signatures and said second set of policies comprise a second set of signatures.

13. The apparatus of claim 10, wherein said means for confirming comprises:
means for retrieving a configuration data containing a community identifier and a role level;
means for identifying said community based on said community identifier; and
means for communicating with other switching devices connected to said network to determine said first set of switching devices in said community and said role to be played by said switching device based on said role level, whereby said role level determines whether to block said first set of packets or said second set of packets.

14. The apparatus of claim 10, wherein said role comprises a secondary role and another switching device takes on a primary role in said community, wherein switching devices with said secondary role operate with less stringent policies according to said first application, said apparatus further comprising:
means for checking whether said first application is operational in said another switching device; and
means for assuming said primary role if said first application is not operational in said another switching device, whereby said switching device applies more stringent policies to block more packets of said plurality of packets compared to when operating with said secondary role.

15. The computer readable medium of claim 7, wherein said confirming comprises:
retrieving a configuration data containing a community identifier and a role level;
identifying said community based on said community identifier; and
communicating with other switching devices connected to said network to determine said first set of switching devices in said community and said role to be played by said switching device based on said role level, whereby said role level determines whether to block said first set of packets or said second set of packets.

16. The computer readable medium of claim 7, wherein said role comprises a secondary role and another switching device takes on a primary role in said community, wherein switching devices with said secondary role operate with less stringent policies according to said first application, said computer readable medium further comprising:
checking whether said first application is operational in said another switching device; and
assuming said primary role if said first application is not operational in said another switching device, whereby said switching device applies more stringent policies to block more packets of said plurality of packets compared to when operating with said secondary role.

17. A communication network comprising:
a first switching device configured with a first value for a community and a second value for a role;
a second switching device configured with said first value for said community and a third value for said role,
wherein said switching device and said another switching device are in a sequential path for processing packets such that the packets forwarded by the first switching device in the sequential path are processed by the other switching device,
wherein said same value for said community indicates that both of said first switching device and said second switching device are members of a same community, wherein each value for said community uniquely identifies a group of switching devices together implementing a corresponding application such that said same first value for said community in both of said first switching device and said second switching device indicates that both switching devices are to together implement a same application,
based on said first value for said community in both the switching devices, said first switching device and said second switching device to communicate with each other to confirm a corresponding one of a primary role and a secondary role, said third value and said second value determining the specific role to be played by the corresponding switching device,
the specific switching device with said primary role being designed to apply a first set of policies in switching packets from one interface to another, the specific switching device with said secondary role being designed to apply a second set of policies in switching packets from one interface to another, wherein said first set of policies are more stringent than said second set of policies such that the switching device with said primary role is likely to block more packets than the switching device with said secondary role when processing same set of packets.

18. The communication network of claim 17, wherein first switching device is located in a corporate office and said second switching device is located in a branch office, wherein said second value and said third value are configured such that said first switching device plays said primary role and said second switching device plays said secondary role.

19. The communication network of claim 17, further comprising a plurality of user systems provided on a network, wherein said network, said first switching device and said second switching device being on a communication path between said plurality of user systems and external systems, wherein said same application executing on each of said first switching device and said second switching device is designed to block undesirable packets from said external systems to said plurality of user systems based on corresponding set of policies.

20. The communication network of claim 19, wherein said application is a anti-virus application and each of said first set of policies and said second set of policies comprises a corresponding set of signatures, wherein each of said first switching device and said second switching device is designed to block different sets of packets based on corresponding applied set of signatures according to said anti-virus application.

* * * * *